Patented July 9, 1940

2,206,877

UNITED STATES PATENT OFFICE 2,206,877

PREPARATION OF CYCLOPROPANE

Walter G. Christiansen, Glen Ridge, N. J., assignor to E. R. Squibb & Sons, New York, N. Y., a corporation of New York No Drawing. Application December 29, 1938,
Serial No. 248,229

5 Claims. (Cl. 260—666)

This invention relates to the preparation of cyclopropane for anesthetic use. Cyclopropane is a valuable general anesthetic, producing surgical anesthesia with comparative safety even at high levels of muscular relaxation and in extended surgical procedures, giving fairly short and uneventful induction and recovery periods.

Cyclopropane is a cyclic hydrocarbon having the structural formula

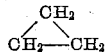

Heretofore it has been prepared by the reduction of trimethylene dihalides with zinc in aqueous alcohol [Gustavson, J. Prakt. Chem. (2) 50, 380 (1894)], trimethylene dibromide giving the best results.

This process has been found to be objectionable, since a considerable quantity of hydrogen is formed by secondary reactions, especially when substances such as copper salts are used to catalyze the primary reaction, as described and claimed in the copending application of W. A. Lott, Ser. No. 139,987, filed April 30, 1937. This generation of hydrogen gives rise to mechanical difficulties in the purification and recovery of the cyclopropane. Cyclopropane is a gas (B. P.—34° C.) and the evolved gas mixture containing it is usually passed through a rectifying column to return vaporized alcohol, then through scrubbers into a refrigerated condenser to condense the cyclopropane. Excessive amounts of noncondensable gases, such as hydrogen, interfere with the proper condensation of the alcohol, render the scrubbing less effective, interfere with the condensation of the cyclopropane, and decrease the yield of condensed cyclopropane.

It is believed that the excessive hydrogen generation is induced by the formation, under the reaction conditions, of a voltaic cell by the metal reduction agent with any other metal present, such as the metal of the reaction equipment. However, it is not intended that the invention shall be limited by any theoretical explanations.

It is an object of this invention to provide an improvement of the reduction method of preparing cyclopropane such as to decrease the objectionable hydrogen formation and increase the yield of cyclopropane.

The process of this invention consists in avoiding the conditions that give rise to excessive hydrogen generation, such as the contact of the reaction mixture with a reactor (i. e., reaction vessels, agitators, and other equipment) presenting to the reaction mixture a surface which would take part in the voltaic action mentioned.

It has been found that the usual hydrogen generation may be reduced as much as 59% by carrying out the reaction in such equipment as a zinc-plated reactor; and that a substantial decrease in hydrogen generation may be effected by the method of this invention even when metal salts are used to catalyze the primary reaction.

Instead of zinc-plating the reactor, a number of other modifications may be used with the same effect. Thus the reaction equipment may be made of, or internally lined with, zinc.

Preferably, the metal reduction agent is in finely divided form. The alcoholic reaction medium may be made up with methyl, ethyl, isopropyl or any other available alcohol. These alcohols may be freely diluted with water.

The following examples are illustrative of the invention:

Example 1

An iron reaction vessel is internally plated with zinc or lined with zinc sheet metal. The agitator and other parts in contact with the reaction mixture are similarly treated. 262 lbs. of zinc dust in 100 gallons of 85% alcohol is placed in this equipment, and while agitating and refluxing, 405 lbs. of trimethylene dibromide is gradually added. The cyclopropane evolved has a low hydrogen content and is recovered in excellent yield.

Example 2

The procedure of Example 1 is modified by the addition of 6 quarts of a 5% solution of copper sulfate to the reaction mixture before the addition of the trimethylene dibromide. The cyclopropane evolved has a low hydrogen content and is recovered in excellent yield.

The invention may be variously otherwise embodied, within the scope of the appended claims.

I claim:

1. The process of preparing cyclopropane which comprises reacting a trimethylene dihalide with zinc in a reactor presenting an inner surface of zinc.

2. The process of preparing cyclopropane which comprises reacting a trimethylene dihalide with zinc in finely-divided form in a reactor presenting an inner surface of zinc.

3. The process of preparing cyclopropane which comprises reacting a trimethylene dihalide with zinc in an aqueous alcoholic medium in a reactor presenting an inner surface of zinc.

4. The process of preparing cyclopropane which comprises reacting a trimethylene dihalide with zinc in the presence of a catalytic metal salt in a reactor presenting an inner surface of zinc.

5. The process of preparing cyclopropane which comprises reacting trimethylene dibromide with zinc in a reactor presenting an inner surface of zinc.

WALTER G. CHRISTIANSEN.